United States Patent [19]

Sharp

[11] Patent Number: 4,504,116

[45] Date of Patent: Mar. 12, 1985

[54] REARVIEW MIRROR POSITIONABLE BY REMOTE CONTROL

[75] Inventor: Bernard C. Sharp, White Plains, N.Y.

[73] Assignee: Parker-Hannifin Corporation, Shelton, Conn.

[21] Appl. No.: 275,681

[22] Filed: Jun. 21, 1981

[51] Int. Cl.³ .............................. G02B 5/08; B60R 1/06
[52] U.S. Cl. ...................................................... 350/637
[58] Field of Search .......................................... 350/289

[56] References Cited

U.S. PATENT DOCUMENTS

| | | | |
|---|---|---|---|
| 3,576,359 | 4/1971 | Cosh | 350/289 |
| 4,056,253 | 11/1977 | Repay et al. | 248/479 |
| 4,094,591 | 6/1978 | Lafont | 350/289 |
| 4,158,483 | 6/1979 | Fisher | 350/289 |
| 4,362,362 | 12/1982 | Usami et al. | 350/289 |

FOREIGN PATENT DOCUMENTS 114139 10/1978 Japan ................................. 350/289

*Primary Examiner*—F. L. Evans
*Attorney, Agent, or Firm*—Albert C. Johnston; Gene S. Winter

[57] ABSTRACT

A rearview mirror positionable by remote control including a housing having a mirror that is held in an open side thereof and that is moveable to desired viewing positions. A plurality of mirror positioning rods displaceable longitudinally relative to the housing have their respective ends connected pivotally with the back of a plate that supports the mirror. Electric motors inside the housing are connected through a compact arrangement of speed reducing gears to drive transmission pinions for displacing each rod and for retaining the rod in adjusted position. Each pinion has a peripheral series of undulations held normally in meshed engagement with a series of undulations along a side of each rod to provide for displacement of the rod upon rotation of the pinion. Each rod and its respective pinion are biased together but will ride over one another under a force exceeding a normal driving force in either longitudinal direction of the rod to thereby avoid damage to the components of the rearview mirror should the mirror be manipulated externally or when a positioning rod is at its limit of travel in either longitudinal direction.

13 Claims, 10 Drawing Figures

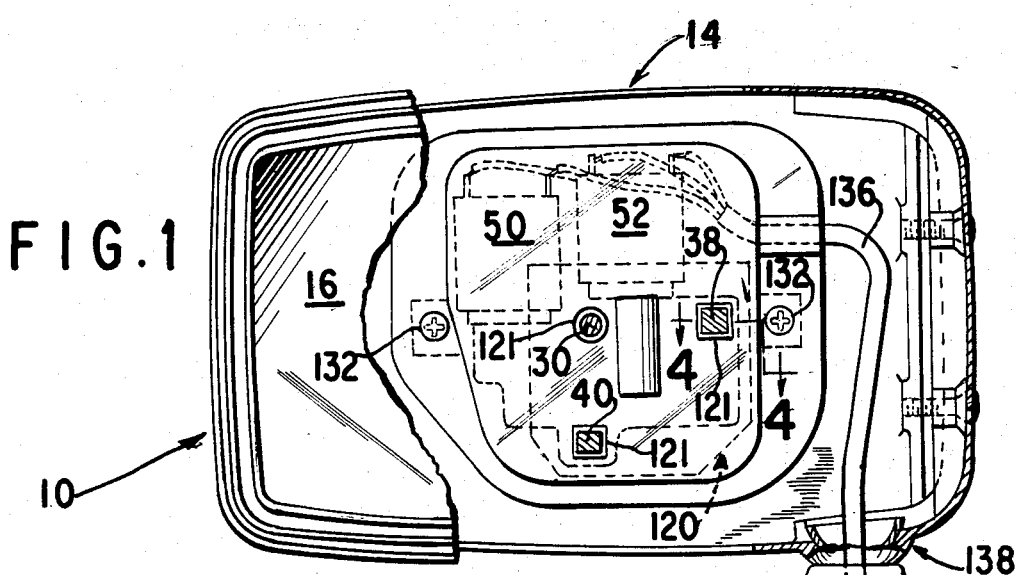
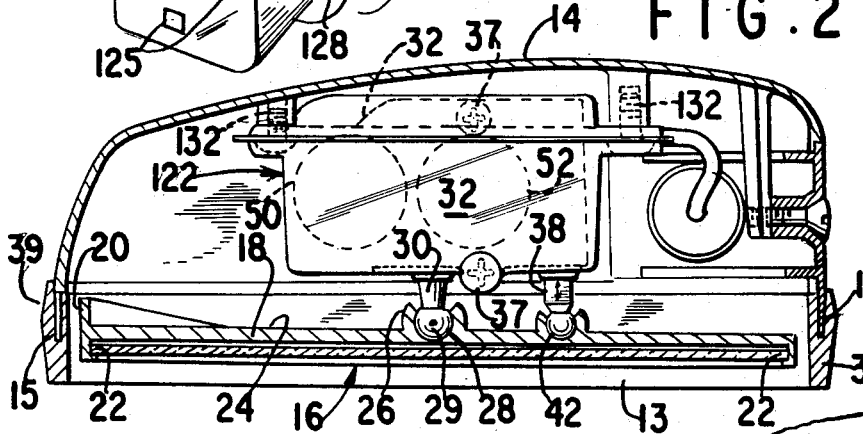
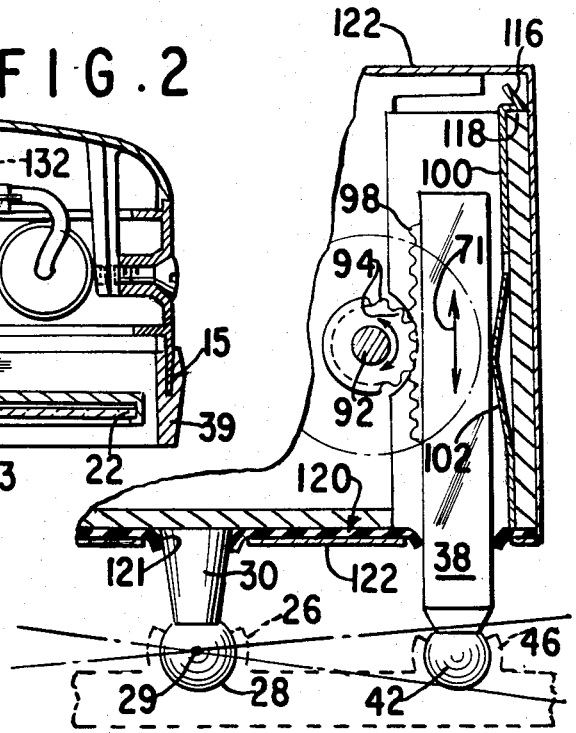

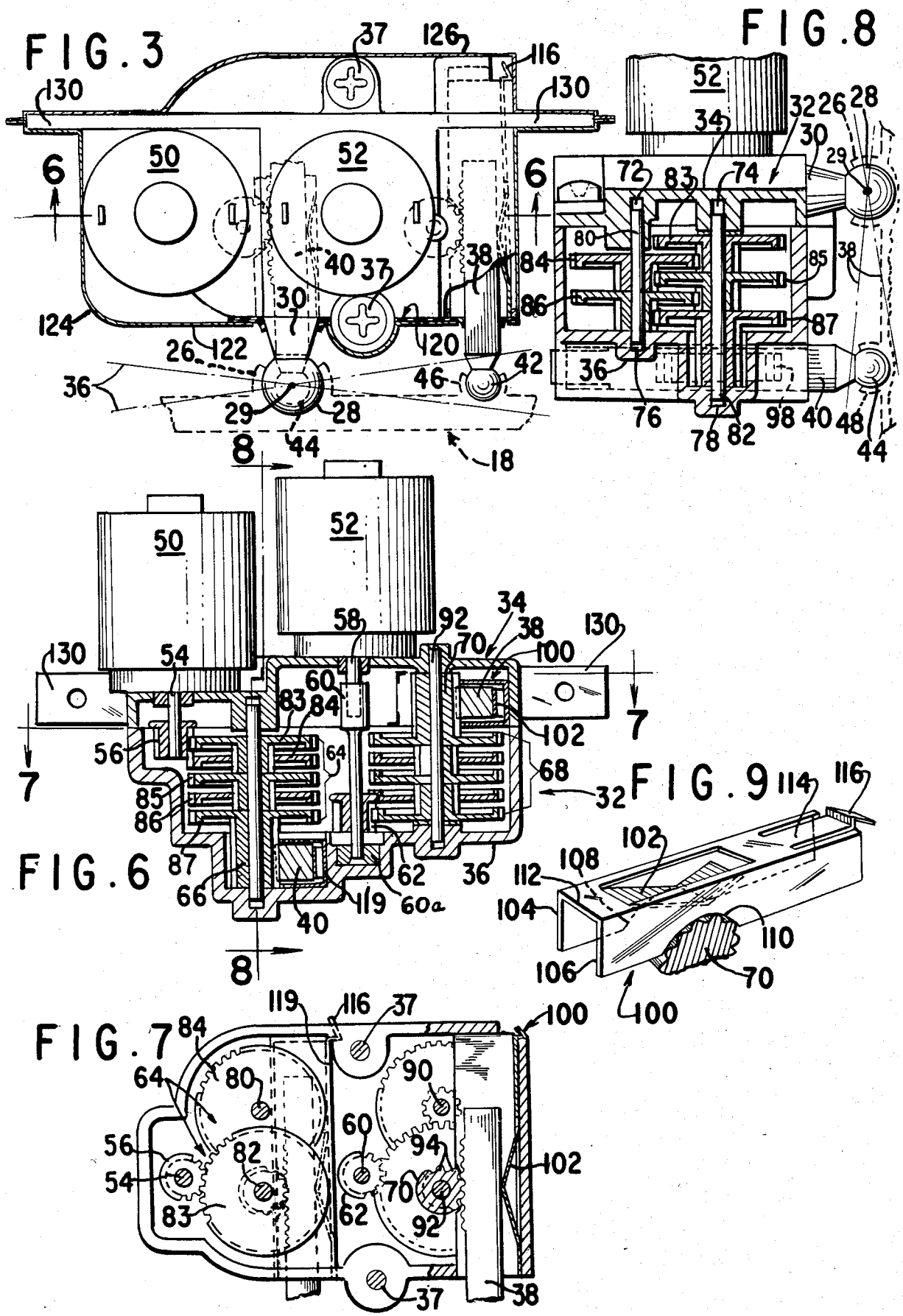

REARVIEW MIRROR POSITIONABLE BY REMOTE CONTROL

This invention relates to a rearview mirror for mounting on a side of a vehicle such as an automobile or truck, and more particularly, a rearview mirror positionable by remote control from within the vehicle.

Rearview mirrors of the type including a mirror housing having a mirror held in an open side thereof and moveable to desired viewing positions by a remote controlled motorized mechanism are known. Examples of them may be seen in U.S. Pat. Nos. 4,158,483, 4,094,591, 4,056,253 and 3,576,359.

U.S. Pat. No. 4,158,483 discloses a rearview mirror wherein the mirror is pivotally supported for rotation about two mutually perpendicular axes with the pivotal drive forces being exerted through a single ball and socket mechanism. This rearview mirror includes a motorized drive mechanism, for pivoting the ball, that automatically declutches in response to efforts to drive the mirror beyond preselected limit positions or in response to manual manipulation of the mirror itself to thereby prevent damage to the motorized drive mechanism. Although the rearview mirror disclosed in this patent provides the desirable advantage of declutching, the motorized drive mechanism for pivoting the ball in the socket is relatively complex. Moreover, in the rearview mirror disclosed in this patent, the motorized mechanism for driving the mirror is enclosed in a case having an open socket portion that receives a ball on the back of the mirror. Although the ball is spring biased into engagement with the walls of the socket portion for the purpose of providing a water-tight seal to prevent incursion of moisture into the case, it is believed that during repeated frictional sliding between the ball and socket, moisture will seep into the case.

One object of the present invention is to provide a rearview mirror positionable by remote control having an improved motorized mechanism, for disposing the mirror at desired viewing positions, that declutches in response to manual manipulation of the mirror itself or to efforts to move the mirror beyond preset limit positions thereof. Moreover, it is a further object to substantially eliminate the incursion of moisture into the casing that encloses the motorized mechanism.

Another object of the invention is to provide a rearview mirror positionable by remote control wherein the motorized mechanism for disposing the mirror is compact and utilizes intermeshing speed reducing gears each having identical construction to reduce the number of different parts required in the motorized mechanism.

According to one feature of this invention, an improved motorized mechanism is provided which is especially useful for a rearview mirror of the type including a mirror held in an open side of a housing and movable to desired viewing positions by remote control from the driver's location inside a vehicle equipped with the mirror. The motorized mechanism includes a plurality of mirror positioning rods displaceable longitudinally relative to the mirror housing and having respective ends connected pivotally with the back of the mirror plate, which has the mirror fixed thereto, at respective locations spaced away from each other. The rods are displaceable in or out to adjust the mirror position and are capable of being retained in adjusted position to thereby position the mirror. A connection provided between each rod and a drive transmission element of the motorized mechanism is slippable to permit relative movement of the rod and its drive transmission element under a force exceeding a normal driving force in either longitudinal direction of the rod to thereby avoid damage to the motorized mechanism should the mirror be moved externally or should the positioning rod be moved to its preset limit of travel.

According to a preferred embodiment of the invention, the drive transmission element in each of the aforementioned slippable connections element is a pinion mounted for rotation adjacent to the related positioning rod and having a peripheral series of undulations thereon which mesh with a series of undulations provided along a side of the positioning rod. The rod and its respective pinion are biased together so that respective undulations thereof are normally held in meshed engagement for displacement of the rod upon rotation of the pinion yet are slippable so as to ride over one another under a force exceeding a normal driving force in either longitudinal direction of the rod.

In accordance with another feature of the invention, the motorized mechanism comprises two driving pinions driven by two electric motors with parallel shafts having the driving pinions mounted thereon. A series of intermeshing speed reducing gears connects each driving pinion with its respective drive transmission pinion, which displaces its respective mirror positioning rod in or out relative to the housing and retains the rod in adjusted position. To provide for a compact drive arrangement while also locating the rods at positions spaced away from each other, one driving pinion is located relatively near its respective electric drive motor and is connected with its drive pinion, which is located substantially away from the electric motor, through a series of speed reducing gears progressing in one direction from a relatively high speed gear at the driving pinion to a relatively low speed gear at the drive pinion. Further, another one of the driving pinions is located substantially away from its respective electric drive motor and is connected with the other drive pinion, which is located relatively near its respective motor through a second series of speed reducing gears progressing in the opposite direction from a relatively high speed gear at the driving pinion to a relatively low speed gear at the drive pinion. The above-described structure provides for a compact drive arrangement for displacing the mirror positioning rods.

In accordance with a further feature of the invention, the motorized mechanism utilizes speed reducing gears having identical construction to reduce the number of different parts required, and, more specifically, each speed reducing gear preferably comprises a combination gear having a relatively small diameter spur gear fixed to one side of a relatively large diameter spur gear. Each series of gears is mounted on two parallel shafts so that the small diameter spur gears on either shaft mesh with large diameter gears on the opposite shaft. One series of combination gears is oriented in one direction whereas the other series of gears is oriented in another direction. This structure allows the use of combination gears each having an identical construction.

In accordance with another feature of the invention, the motorized mechanism is enclosed in a water-proof envelope. The speed reducing gears and the mirror position rods are positioned in a casing comprising upper and lower casing sections, which may be easily and quickly assembled. The electric motors are seated on the upper surface of the upper casing section. The casing with the motors seated thereon is enclosed in an envelope having a rear envelope section and a front envelope section including openings therein for receiving the mirror positioning rods. To seal the rods with respect to the envelope openings, a resilient seal having apertures for slidably engaging and receiving the rods is provided and is pressed between the interior surface of the front envelope section and the casing when the casing is assembled in the envelope.

The foregoing and other objects, features and advantages of the invention will be further apparent from the following detailed description and the accompanying drawings of illustrative embodiments thereof.

In the drawings:

FIG. 1 is a front plan view, with a portion of the mirror and the housing broken away, of a rearview mirror positionable by remote control in accordance with the invention;

FIG. 2 is a view thereof in top elevation with a portion of the mirror housing and the mirror plate sectioned away;

FIG. 3 is a top plan view of the casing for the mirror positioning rods and the speed reducing gears with the mirror positioning rods and their respective drive transmission pinions shown in phantom, the casing having electric motors mounted on the top thereof;

FIG. 4 is a sectional view along the plane 4—4 of FIG. 1;

FIG. 5 is an exploded perspective view of a motor envelope for containing the casing and the electric motors shown in FIGS. 3, 6, 7 and 8;

FIG. 6 is a sectional view along the plane 6—6 of FIG. 3;

FIG. 7 is a sectional view along the plane 7—7 of FIG. 6;

FIG. 8 is a sectional view along the plane 8—8 of FIG. 7;

FIG. 9 is an expanded perspective view of a guide spring for receiving a mirror positioning rod and a drive transmission element for displacing the rod;

FIG. 10 shows a side view of a series of undulations on the drive transmission pinion meshing with a series of undulations on a side of the mirror positioning rod and shows in phantom the undulations riding over one another.

With reference to FIGS. 1 and 2, a rearview mirror 10 positionable by remote control is shown. Rearview mirror 10 is suitable for attachment to the side of a vehicle such as an automobile or a truck by a mirror mounting device having a support post 12, further described hereinafter. The various components of the rearview mirror are contained within a housing 14 that has an opening 13 at the front side thereof to provide for positioning of mirror 16 therein. A rim 39 of elstomeric material fits onto an edge 15 of the housing surrounding the mirror 16. Mirror 16 is mounted on the face of a support plate 18 having a perimeter wall 20 which forms a groove 22 for receiving the mirror and retaining it in fixed position relative to the plate 18.

Referring to FIGS. 2, 3, 4 and 8, the back 24 of the mirror plate includes a generally spherical socket 26 for receiving a swivel ball 28 which is held in a fixed position relative to housing 14. The swivel ball and socket hold the mirror plate to and swivelable about a fixed point 29 at the center of ball 28 fixed relative to the housing. Ball 28 is mounted on a mirror support post 30 which is fixed to and protrudes forward from a casing 32.

The motorized mechanism for disposing the mirror plate 24 at desired viewing positions of the mirror fixed thereto will now be described. Referring to FIGS. 1-8 and 10, and in particular FIGS. 3 and 8, two mirror positioning rods 38 and 40 are provided. Rods 38 and 40 are displaceable longitudinally relative to the housing and have respectively ball members 42 and 44 on the ends thereof pivotally connected with ball sockets 46 and 48 on the back 24 of mirror plate 18. The ball members 42 and 44 are pivotally connected with the back of a plate at locations spaced away from each other and spaced away from the pivotal connection between ball 28 and socket 26. Referring in particular to FIG. 3, as mirror positioning rod 38 is displaced longitudinally inwardly or outwardly, the mirror plate 18 is swivelled in one plane about spherical ball 28 as shown by lines 36. As shown particularly well in FIG. 8, as the other mirror positioning rod 40 is displaced inwardly or outwardly, mirror supporting plate 18, and thus mirror 16, swivels in another plane about spherical ball 28 as shown by lines 38. As can be well appreciated, by displacing rods 38 and 40 inwardly or outwardly relative to the housing and by retaining the rods in adjusted position, the mirror 16 is disposed at desired viewing positions.

Referring to FIGS. 3-7, the portion of the motorized mechanism that displaces mirror positioning rods 38 and 40 and that retains the rods in adjusted position will now be described. Electrical motors 50 and 52 are mounted on upper casing section 34 of casing 32 and have shafts 54 and 58 extending in parallel relation to one another downwardly into the interior of casing 32. The shaft 54 of motor 50 has a driving pinion 56 mounted on the end thereof that is located relatively near the drive motor 50. Motor 52 includes a shaft 58 connected through shaft extension 60 to a driving pinion 62 that is located substantially away from electric motor 52. The shaft extension 60 is seated at its lower end in a bronze bearing 60a. The driving pinion 56 is connected through a first series of speed reducing gears 64 (See FIG. 6) that progress in one direction from a relatively high speed gear at the driving pinion 56 to a relatively low speed gear at drive transmission pinion 66. In a similar manner, the other driving pinion 62 is connected through another series of intermeshing speed reducing gears (See FIG. 6) progressing in an opposite direction from a relatively high speed gear at the driving pinion 62 to a relatively low speed gear at drive transmission pinion 70.

Referring to FIG. 8, the first series of speed reducing gears 64 and the casing for the gears will be described in detail. The casing 32 comprises an upper casing section 34 which interfits with a lower casing section 36. Upper casing section 32 is formed with downwardly open sockets 72 and 74 and lower casing section 36 is formed with upwardly open sockets 76 and 78. Sockets 72 and 76 receive and constitute bearings for the lower and upper ends of shaft 80. Sockets 74 and 78 receive and constitute bearings for the lower and upper ends of shaft 82. Each speed reducing gear 83, 84, 85, 86 and 87 comprises a combination gear having a relatively small diameter spur gear fixed to one side of a relatively large diameter spur gear. Referring to FIG. 6 and 7 as well as FIG. 8, driving pinion 56, which is mounted on shaft 54 of electric motor 50, engages the large diameter spur gear of combination gear 83. The combination gears 83, 84, 85, 86 and 87 are mounted on the two parallel shafts 80 and 82 so that the small diameter spur gears on either shaft mesh with the large diameter gears on the opposite shaft. Combination gear 87 has fixed to one side thereof drive transmission pinion 66 which, as will be described hereinafter, displaces rod 40 in or out to adjust the mirror position. Referring to FIGS. 6 and 7, the second series 68 of speed reducing gears is identical to the series 67 except that the series 68 is oriented in an opposite direction from the direction in which series 64 is oriented. Series 68 of speed reducing gears are likewise mounted on two parallel shafts 90 and 92 having ends received by sockets in the upper and lower casing sections 34 and 36.

Referring in particular to FIG. 4 as well as FIGS. 6–8, and 10, the mechanism for displacing rods 38 and 40 in and out to adjust the mirror position will now be described in detail. Drive transmission pinion 70 is rotatable on shaft 92 that has an axis transverse to the path 71 of movement of rod 38. Pinion 70 has a peripheral series of undulations 94 movable by rotation of pinion 70 in a path directed longitudinally of positioning rod 38. Rod 38 has on and along a side 96 thereof a series of undulations 98 which mesh with undulations 94 of drive transmission pinion 70.

A slippable connection is provided between drive transmission pinion 70 and rod 38 to permit relative movement of the rod and its drive transmission 70 under a force exceeding a normal driving force in either longitudinal direction of rod 38. Rod 38 is movable in a guide channel 100 containing a spring 102 that biases rod 38 laterally against drive pinion 70 so that respective undulations thereof are normally held in meshed engagement but will rode over one another under a force exceeding the normal driving force in either longitudinal direction of the rod. For example, if the mirror 16 is manipulated by hand or is contacted by other objects such as a cleaning brush in automated car wash or a branch from shrubbery, and rod 38 is urged inwardly or outwardly, undulations 98 on the rod will be pushed against undulations 94 of drive pinion 70. Since pinion 70 will not rotate unless actuated by its electric motor, the rod 38 will be forced laterally against spring 102 and will be displaced from the position shown in solid lines in FIG. 11 to the position shown in phantom to allow relative movement of rod 38 with respect to pinion 70. Moreover, as can be seen in FIG. 4, the undulations 98 extend only a portion of the length of rod 38 to define preset limit positions of movement of the rod. If the rod is moved to one of the extreme limit positions, further rotation of pinion 70 will urge undulations 94 against undulations 98 of rod 38 to thereby force rod laterally against spring 102 and allow the undulations on the pinion to ride over the undulations on the rod. The slippable connection between rod 40 and its respective drive pinion is identical to the slippable connection described with respect to rod 40 and drive pinion 70 and, thus, need not be described in detail.

Referring to FIGS. 4 and 9, the guide channel 100 will now be described in detail. Guide channel 100 comprises an elongate U-shaped member preferably made of spring steel. Sides 104 and 106 of guide channel 100 have curved recesses 108 and 110 for receiving drive pinion 70. Wall 112, which extends between sides 104 and 106, includes a spring 102 extending into the channel for biasing a rod placed in the channel against drive pinion 70. At one end of the wall 112, a clip 114 for securing channel 100 in casing 34 is provided. Clip 114 includes an outwardly extending lip 116 that engages wall 118 (see FIG. 4) which is integrally formed in casing 32. Similarly, as shown in FIGS. 6 and 7, rod 40 is positioned in a guide channel 119 which is identical in construction to guide channel 100 shown in FIG. 9.

To assemble the rear view mirror 10, the internal components of the casing are positioned in upper and lower casing sections 34 and 36 and then the casing sections are fitted together to form a single casing 32 having motors 50 and 52 mounted on top thereof. Upper casing section 34 is formed at its upper side with surfaces 33 and 35 seating respectively motors 50 and 52 (see FIG. 10). Casing sections 34 and 36 are held together by two screw fasteners 37 (see FIGS. 2, 3, 7 and 8).

Referring to FIGS. 4 and 5, a resilient sealing lining 120 having flanged apertures 121 for snugly receiving rods 38 and 40 and mirror support post 30 is provided to prevent moisture from seeping into casing 32. A substantially weatherproof envelope 122 having a front envelope section 124 and a rear envelope section 126 is provided and encases casing 32. Front envelope section 124 has openings 125 therein through which positioning rods 38 and 40 and mirror post 30 extend to plate 18 with the seal 120 slidably engaging the rods 38 and 40 at envelope openings 125. Resilient seal 120 is pressed against the inner surface of front envelope section 124, between it and the front of casing 32, when the front and rear sections of the envelope 122 are assembled. Mating peripheral flanges on the envelope sections 124 and 126 form recesses 128 for receiving securement ears 130 which extend outwardly from the sides of upper casing section 34 (see FIGS. 5 and 6). The envelope 122 together with casing 32 is secured to the interior back of housing 14 by two screw fasteners 132 shown in FIGS. 1 and 2. The flanges of envelope sections 124 and 126 also form a recess 134 for accommodating the wires 136 that run from a manual control in the interior of the vehicle (not shown) to electric motors 50 and 52.

As shown in FIG. 1, mirror housing 14 is mounted on support post 12 through a ball and socket member 138. This ball and socket member allows for manual adjustment of the housing 14 to a desired viewing position. Post 12 at the bottom thereof may include a mounting mechanism 140 that is adaptable for mounting it at any of various angles in relation to a vehicle body or door surface. This mounting mechanism is described in a copending U.S. patent application Ser. No. 200,469 filed Oct. 24, 1980.

A motorized rearview mirror in accordance with the present invention is particularly inexpensive to manufacture because the speed reducing gears, as well as the driving pinions and the drive pinions for displacing the rods are assembled in interfitting upper and lower casing sections that may be quickly assembled. Access of moisture to the motorized components of the rearview mirror is eliminated or substantially reduced by use of a sealed casing containing the speed reducing gears and use of a sealed envelope containing the electric motors and the casing.

Although a specific embodiment of the present invention has been described above in detail, it is to be understood that this is for the purposes of illustration. Modifications may be made in the form of the component parts or in their arrangement in order to adapt them to particular requirements of the manufacture or use of the rearview mirror.

What is claimed is:

1. In a rearview mirror positionable by remote control, including a mirror housing having an open side, a mirror supporting plate held in said open side and a motorized mechanism inside the housing for disposing said plate at desired viewing positions of a mirror fixed to the plate, the improvement wherein said mechanism comprises:
   a plurality of mirror positioning rods displaceable longitudinally relative to said housing and having respective ends connected pivotably with the back of said plate at respective locations spaced away from each other
   and means including for each of said rods a slippable connection between the rod and a drive transmission element of said mechanism for displacing the rod in or out to adjust the mirror position and for retaining the rod in adjusted position, each said connection being slippable to permit relative movement of the rod and its said drive transmission element under a force exceeding a normal driving force in either longitudinal direction of the rod, each said drive transmission element being rotatable on an axis transverse to the path of the related rod, each said connection comprising relatively slippable co-engaging surface formations respectively on the periphery of said transmission element and on and along a side of said rod,
   each said drive transmission element having thereon a peripheral series of undulations movable thereby in a path directed longitudinally of the related positioning rod, each said rod having on and along a side thereof a series of undulations to mesh with undulations of its said drive transmission element, and means biasing together each said rod and its said drive transmission element so that respective undulations thereof normally are held in meshed engagement but will ride over one another under said force.

2. A rearview mirror according to claim 1, each said drive transmission element being a drive pinion mounted for rotation adjacent to the related mirror positioning rod about an axis perpendicular to said path, each said rod being movable in a guide channel permitting the rod to be displaced laterally and containing spring means biasing the rod laterally against its drive pinion.

3. In a rearview mirror positionable by remote control, including a mirror housing having an open side, a mirror supporting plate held in said open side and a motorized mechanism inside the housing for disposing said plate at desired viewing positions of a mirror fixed to the plate, the improvement wherein said mechanism comprises:
   a plurality of mirror positioning rods displaceable longitudinally relative to said housing and having respective ends connected pivotably with the back of said plate at respective locations spaced away from each other
   and means including for each of said rods a slippable connection between the rod and a drive transmission element of said mechanism for displacing the rod in or out to adjust the mirror position and for retaining the rod in adjusted position, each said connection being slippable to permit relative movement of the rod and its said drive transmission element under a force exceeding a normal driving force in either longitudinal direction of the rod,
   said displacing and retaining means further including for each drive transmission element, a series of intermeshing speed reducing gears connecting the drive transmission element with a driving pinion on the shaft of a rotary electric motor mounted inside said housing, one of said driving pinions being located relatively near to its motor and being connected with a said drive transmission element located substantially away from the motor through a said series of speed reducing gears that progresses in one direction from a relatively high speed gear at said pinion to a relatively low speed gear at said drive transmission element, another said driving pinion being located substantially away from its motor and connected with the shaft of the motor through a shaft extension and being near to the motor through a second said series of speed reducing gears that progresses in the opposite direction from a second relatively high speed gear at the driving pinion to a relatively low speed gear at the drive transmission element, whereby a compact drive arrangement is obtained with the motors at the same side thereof and their shafts substantially parallel.

4. A rearview mirror according to claim 3, and a casing having said rods mounted therein, and enclosing said displacing and retaining means, said speed reducing gears of each series thereof being mounted on upright shafts, said casing comprising interfitting lower and upper casing sections formed respectively with upwardly open and downwardly open sockets which receive and constitute bearings for the lower and upper ends of said gear shafts.

5. A rearview mirror according to claim 4, said upper casing section being formed at its upper side with surfaces seating said motors and having openings therein through which the shafts of said motors extend to connections with said driving pinions inside said casing.

6. A rearview mirror according to claim 4, said upper casing section having a mirror support post fixed to and protruding forward from it at a location spaced away from said mirror positioning rods, said post and the back of said plate having thereon interfitting swivel ball and socket members supporting said plate for swivel movement about the center of said ball member, said one series of speed reducing gears being connected with said drive member engaged with a said rod mounted in said lower casing section and said second series of speed reducing gears being connected with a said drive member engaged with a said rod mounted in said upper casing section.

7. A rearview mirror according to claim 6, said mechanism being sealed inside a substantially weatherproof plastic envelope having openings therein through which said positioning rods and said support post extend to said plate with sealing means slidably engaging said rods and engaging said post at said envelope openings.

8. In a rearview mirror positionable by remote control including a mirror housing, a mirror supported by said housing, and a motorized mechanism inside said housing including drive motor means and at least one displaceable member for adjusting the position of said mirror, the improvement wherein said motorized mechanism comprises:
   a driving pinion drivable by said motor means;

a drive transmission element for displacing said displaceable member and retaining it in adjusted position;

a series of intermeshing speed reducing gears mounted on substantially parallel shafts and connecting said drive transmission element with said driving pinion, said series of speed reducing gears progressing in one direction from a relatively high speed gear at said driving pinion to a relatively low speed gear at the drive transmission element; and a casing comprising interfitting lower and upper casing sections each formed respectively with downwardly open and upwardly open sockets which receive and constitute bearings for lower and upper ends of said shafts whereby a compact drive arrangement is obtained.

9. A rearview mirror according to claim 8 including two said displaceable members for adjusting the mirror position, two driving pinions driven by said motor means, two drive transmission elements each for displacing one of said members, and two said series of intermeshing speed reducing gears each for connecting a said drive transmission element with one of said pinions, one said driving pinion being located relatively near said drive motor means and being connected with a said drive transmission element located substantially away from said motor means through a said series of speed reducing gears that progresses in said out direction, another said driving pinion being located substantially away from said motor means and being connected with a said drive transmission element relatively near said motor means through a second said series of speed reducing gears that progresses in the opposite direction from a relatively high speed gear at its pinion to a relatively low speed gear at its drive transmission element.

10. A rearview mirror according to claim 9, each said speed reducing gear comprising a combination gear having a relatively small diameter spur gear fixed to one side of a relatively large diameter spur gear, each said series of gears being mounted on two parallel shafts so that small diameter spur gears on either shaft mesh with large diameter gears on the opposite shaft, said one driving pinion meshing with a large diameter spur gear of one series of gears oriented in one direction, said other driving pinion meshing with a large diameter gear of another series of combination gears oriented in an opposite direction.

11. A rearview mirror according to claims 9 or 10, said drive motor means comprising two electric motors mounted on the upper casing section and having their shafts extending therethrough into the casing, said one driving pinion meshing with one series of speed reducing gears mounted on two parallel shafts having their ends positioned in sockets in the lower and upper casing sections, said other driving pinion meshing with said second series of speed reducing gears mounted on two other parallel shafts having their ends positioned in sockets in the lower and upper casing sections.

12. A rearview mirror according to claim 11, and a substantially water-tight envelope enclosing said casing and said electrical motors, said envelope having openings therein receiving said mirror positioning members and having thereon a sealing lining engaging about the mirror positioning members to provide a substantially water-tight seal with them.

13. In a rearview mirror positionable by remote control including a mirror housing, a mirror supported by said housing, and a motorized mechanism inside said housing including drive motor means and two displaceable members for adjusting the position of said mirror, the improvement wherein said motorized mechanism comprises:

two driving pinions drivable by said motor means;

a drive transmission element for displacing each said displaceable member and retaining it in adjusted position; and a series of intermeshing speed reducing gears for connecting each said drive transmission element with one of said driving pinions, one said driving pinion being located relatively near said drive motor means and being connected with a said drive transmission element located substantially away from said motor means through one said series of speed reducing gears progressing in one direction from a relatively high speed gear at the drive transmission element, another said driving pinion being located substantially away from said motor means and being connected with said drive transmission element relatively near said motor means through a second said series of speed reducing gears progressing in the opposite direction from a relative high speed gear at the pinion to a relatively low speed gear at the drive transmission element, whereby a compact drive arrangement is obtained with the drive motor means at one side thereof.

* * * * *